United States Patent [19]

Fischer et al.

[11] 4,309,332
[45] Jan. 5, 1982

[54] ETHYLENE-VINYL ACETATE COPOLYMER RUBBERS

[75] Inventors: Joseph Fischer; John M. Hoyt, both of Cincinnati, Ohio

[73] Assignee: National Distillers & Chemical Corp., New York, N.Y.

[21] Appl. No.: 146,926

[22] Filed: May 5, 1980

Related U.S. Application Data

[62] Division of Ser. No. 26,149, Apr. 2, 1979, Pat. No. 4,243,576.

[51] Int. Cl.$^3$ .................... C08L 31/04; C08L 23/08
[52] U.S. Cl. .................. 260/40 R; 260/37 N; 260/42.15; 260/42.33; 260/42.46; 260/42.39; 260/45.8 N; 260/42.47; 525/170; 525/186; 525/194; 525/192; 525/211; 525/222; 525/123; 525/229

[58] Field of Search ............... 525/222, 192, 213, 123, 525/170, 229; 260/42.47, 42.88, 40 R

[56] References Cited

U.S. PATENT DOCUMENTS 3,873,494   3/1975   Lewis .................... 260/42.37

Primary Examiner—Carman J. Seccuro
Attorney, Agent, or Firm—Kenneth D. Tremain

[57] ABSTRACT

The Mooney viscosity and green strength of ethylene-vinyl acetate (EVA) copolymer gum stock is improved by the addition thereto of a suitable elastomer such as: high viscosity ethylene propylene rubber (EPR); nitrile rubber; polychloroprene; polyacrylate rubber; polyurethane; chlorinated polyethylene; polyester; ethylene-propylene diene monomer (EPDM) terpolymer; and other elastomers such as ethylene-methyl acrylate, ethylene butyl acrylate and acrylonitrile types.

9 Claims, No Drawings

ETHYLENE-VINYL ACETATE COPOLYMER RUBBERS

This is a division of application Ser. No. 026,149, filed Apr. 2, 1979, now U.S. Pat. No. 4,243,576.

BACKGROUND OF THE INVENTION

1. Field of the Invention

This invention relates to the field of polymer blends, or alloys, and in particular, this invention relates to blends of rubbery EVA copolymer and at least one other elastomer.

2. Description of the Prior Art

EVA copolymers constitute a well-known class of synthetic resins demonstrating a broad range of properties depending upon the relative quantities of copolymerized ethylene and vinyl acetate (and other ethylenic monomers which may be present) in the copolymer chain. Rubbery amorphous EVA gum stocks contain from about 40% to about 70% vinyl acetate by weight randomly distributed throughout the copolymer chain and, when crosslinked, for example, by a peroxide crosslinking agent, possess properties which make them especially useful as elastomers for rubber compounding, as base copolymers for adhesive formulations and as impact modifiers for polyvinyl chloride (PVC). Among the physical and chemical properties which make the rubbery EVA copolymers attractive for such applications are the following: heat aging resistance; oil and solvent resistance; low compression set; good low temperature performance; excellent weatherability and ozone resistance; resistance to natural light; transparent or white-to-black vulcanizates; high loadability; receptance to dielectric heating; and high dampening characteristics. Thus, the rubbery EVA copolymers are excellent candidates for such automotive applications as gaskets, seals and O-rings, wire insulation, radiator tubing and hose, bumper strips and auto body filler panels and are ideal for other demanding applications as well such as machinery mounts, weather stripping, washing machine hose, refrigerator gaskets, hydraulic hose, and the like.

It has been observed that, as synthesized by the high pressure process, the ethylene-vinyl acetate copolymers of this invention exhibit Mooney viscosities of only about 8-12, and although it has been found that these values can be approximately doubled by a suitable thermal working process (U.S. Pat. No. 3,968,091) the resulting worked gum stocks are still deficient in Mooney viscosity and green strength for many applications in the rubber industry. Accordingly, successful processing of EVA gum stocks of from about 40% to about 70% copolymerized vinyl acetate by weight requires that the Mooney viscosity and green strength be suitably increased, without, however, detracting to any appreciable extent from the desirable characteristics of rubbery EVA copolymers enumerated above.

While it is known that EVA copolymers and graft copolymers of EVA with another monomer such as vinyl chloride can be blended with one or more other elastomers (cf. U.S. Pat. Nos. 3,282,035; 3,322,858; 3,361,850; 3,361,852; 3,374,198; 3,422,055; 3,549,727; 3,600,461; 3,644,577; 3,718,711; 3,758,661; 3,808,047; 3,821,333; 3,941,859; and 4,102,855), heretofore there has been no recognition or appreciation that the Mooney viscosity and green strength of EVA gum stocks containing from about 40% to about 70% vinyl acetate by weight can be significantly increased upon the addition of certain elastomers as hereinafter described.

SUMMARY OF THE INVENTION

It has now been discovered that the addition of from about 10% to about 40% by weight of an elastomer having a Mooney viscosity within the range of from about 65 to about 115 $ML_{1+4}$ at 100° C. to from 90% to about 60% by weight of an amorphous EVA gum stock containing from about 40% to about 70% copolymerized vinyl acetate by weight results in a significant increase in Mooney viscosity and green strength of the EVA gum stock without negatively affecting the physical and chemical properties of the EVA copolymer in any appreciable way.

The improved EVA rubbers of this invention can be easily processed employing known and conventional machinery and techniques and are suitable for injection molding, compression molding, transfer molding and profile extrusion.

DESCRIPTION OF THE PREFERRED EMBODIMENTS

The useful EVA gum stocks herein contain from about 40% to about 70% copolymerized vinyl acetate by weight and are amorphous in nature, and the constituent monomers are randomly distributed throughout the copolymer chain. The most significant improvement in Mooney viscosity and green strength in accordance with this invention is achieved with EVA gum stocks having a vinyl acetate content of from about 50% to about 60% by weight. In addition to the two principal monomers, ethylene and vinyl acetate, the EVA gum stocks of this invention can contain small quantities, generally not exceeding about 10% by weight, of one or more other ethylenically unsaturated monomers copolymerizable therewith. Examples of such monomers include (meth) acrylate ester, e.g., ethyl acrylate, butyl methacrylate, 2-hydroxy ethyl acrylate, and the like; vinyl esters, e.g., vinyl stearate, vinyl versatate, vinyl benzoate, and the like; vinyl ethers, e.g., ethyl vinyl ether, hexyl vinyl ether, and the like; and, carbon monoxide. The preferred EVA gum stocks herein are the VYHATHENE ® resins (U.S. Industrial Chemicals Co., Division of National Distillers and Chemical Corporation) whose typical physical properties are given in Table I as follows:

TABLE I

Typical Physical Properties of VYNATHENE EVA Elastomers (Raw Gum Stock)

|  | EY 903 | EY 904 | EY 906 | EY 907 |
|---|---|---|---|---|
| Vinyl acetate content | 45% | 52% | 55% | 60% |
| Density | 0.948 | 0.986 | 1.00 | 1.02 |
| Mooney Viscosity (ml 1 + 4 at 100° C.) | 20 | 20 | 20 | 20 |
| Color | Water White | Water White | Water White | Water White |
| Form | Pellets | Pellets | Slabs | Slabs |
| Volatiles | Less than 0.3% | Less than 0.3% | Less than 0.3% | Less than 0.3% |

As previously stated, from about 60% to about 90% by weight of EVA gum stock is blended with from 40% to about 10% by weight of at least one other elastomer having a Mooney viscosity of from about 65 to about 115 $ML_{1+4}$ at 100° C. Examples of elastomers which are useful for addition to EVA gum stock to improve the Mooney viscosity and green strength of the latter are high viscosity ethylene propylene rubber (EPR); polychloroprene; polyacrylate rubber, polyurethane; chlorinated polyethylene; polyester; ethylene-propylene diene monomer (EPDM) terpolymer; acrylate copolymers such as ethylenemethyl acrylate and ethylene-butyl acrylate copolymers and acrylonitrile. The foregoing elastomers can be prepared to include additional quantities of other copolymerizable monomer as long as the Mooney viscosity of the resulting resins do not exceed the range, supra.

Increases of as little as 10% over the original Mooney viscosity of the unalloyed EVA gum stock result in an observable improvement in the processing characteristics of EVA rubbers. In accordance with this invention, the addition of an elastomer of the aforesaid type will provide at least about a 10% increase in Mooney viscosity and increases of nearly 100% are readily attainable.

To prepare the polymer blends of this invention, the EVA gum stock and modifying elastomer together with a crosslinking (vulcanizing) agent and optional ingredients such as fillers, antioxidants and any other known elastomer additives are combined in conventional mixing equipment, typified by a two roll rubber mill, a mixing extruder or preferably a high shear internal mixer such as a Banbury mixer, until a homogeneous blend is obtained. Upon completion of the mixing stage, the resin blend is processed into any of several forms convenient for subsequent manufacturing operations, for example, pellets formed by an underwater pelletizer, strand cut, etc.

The crosslinking agents which can be used herein include such peroxides as: t-butyl perbenzoate, dicumyl peroxide; 2,5-dimethyl-2,5-di(t-butyl peroxy) hexane; 2,5-dimethyl-2,5-di(t-butyl peroxy) hexyne-3; 1,3,5-tris-[alpha, alpha-dimethyl-alpha-(t-butyl peroxy)]-methyl benzene; alpha, alpha-bis(t-butyl peroxy) diisopropyl benzene; and, n-butyl -4,4-bis(t-butyl peroxy) valerate. These crosslinking agents can be used alone or in combination with any of several polyfunctional auxiliary crosslinking agents such as triallyl phosphate; trimethylol propane triacrylate; diallyl fumarate; triallyl cyanurate; triallyl isocyanurate; pentaerythritol tetraacrylate; trimethylol propane trimethacrylate; 1,3-butylene glycol dimethacrylate; allyl methacrylate; ethylene glycol dimethacrylate; and, 1,3-butylene glycol diacrylate. A preferred curing agent for use herein is Vul-Cup 40 KE (40% alpha, alpha'-bis(t-butyl peroxy diisopropyl benzene on Burgess KE obtained from Hercules Inc.) The amount of peroxide crosslinking agent can range from about 1.0 to about 10.0 parts, and preferably from about 2.0 parts to about 5.0 parts per hundred parts of EVA copolymer. The polyfunctional auxiliary crosslinking agents are useful within the range of from about 0.1 to about 3.0 parts per hundred parts of EVA gum stock.

Examples of fillers which can advantageously be employed herein are: Hydral 710, an alumina trihydrate obtained from Alcoa; Hi-Sil EP and Hi-Sil 233, amorphous precipitated hydrated silicas obtained from PPG Industries, Inc.; Cab-O-Sil, a fumed silica obtained from Cabot Corporation; Mistron Monomix, a talc (magnesium silicate) from Cyprus Industrial Minerals Company; Burgess KE, a surface treated (silane) calcined kaolin clay (anhydrous aluminum silicate) obtained from the Burgess Pigment Company; and, antimony oxide. As is appreciated by those skilled in the art, the amounts of filler incorporated into a polymer blend of this invention will depend on the nature of the filler and the properties desired of the final product. Non-reinforcing fillers such as alumina trihydrate can be used in amounts ranging from about 5.0 parts to about 400.0 parts and preferably from about 100.0 parts to about 150.0 parts, per hundred parts of polymer blend. Reinforcing fillers such as hydrated silica, carbon black and sintered colloidal silica are useful in the range of from about 5 parts to about 100 parts per hundred parts of polymer blend but the useful upper range is limited by the high viscosity imparted by fillers of this type. The preferred amounts of these reinforcing fillers range from about 20 parts to about 80 parts per hundred parts of polymer blend for hydrated silica and carbon black and from about 10 parts to about 50 parts per hundred parts of polymer blend for sintered colloidal silica.

Any of several known and conventional antioxidants can be incorporated into the polymer blends herein at from about 0.1 parts to about 4.0 parts, and preferably at about 1.0 part, per hundred parts of resin. Agerite MA (R. T. Vanderbilt Company, Inc.), a polymerized trimethyl dihydroquinoline antioxidant, has been used with good result.

In the following examples the results of which are summarized in Table II below, Example 1 is illustrative of an EVA gum stock processed in the absence of an elastomer meeting the requirements of this invention and Examples 2 through 8 are illustrative of EVA gum stocks containing a modifying elastomer (with Mooney viscosity measured at $ML_{1+4}$ at 100° C. except where indicated) in accordance with this invention.

TABLE II

| | EVA GUM STOCK & MODIFYING ELASTOMERS | | | | | | | |
|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| VYNATHENE® EY 907 | 100.0 | 80.0 | 80.0 | 60.0 | 80.0 | 80.0 | 90.0 | 90.0 |
| VISTALON 5600 (Exxon), an EPDM rubber having a Mooney viscosity of 97.5 | — | 20.0 | — | — | — | — | — | — |
| VISTALON 606 (Exxon), an EPR rubber having a Mooney viscosity of 88 | — | — | 20.0 | 40.0 | — | — | — | — |
| HYCAR 1411 (B.F. Goodrich), a nitrile rubber having a Mooney viscosity of 115* | — | — | — | — | 20.0 | — | — | — |
| EPCAR 847 (B.F. Goodrich), an EPDM rubber having a Mooney viscosity of 80* | — | — | — | — | — | 20.0 | — | — |
| EPCAR 5465 (B.F. Goodrich), an EPDM extended with about 50 weight percent oil** | — | — | — | — | — | — | 10.0 | — |
| EPCAR 046 (B.F. Goodrich), an | — | — | — | — | — | — | — | 10.0 |

TABLE II-continued

| | EVA GUM STOCK & MODIFYING ELASTOMERS | | | | | | | |
|---|---|---|---|---|---|---|---|---|
| | EXAMPLE 1 | EXAMPLE 2 | EXAMPLE 3 | EXAMPLE 4 | EXAMPLE 5 | EXAMPLE 6 | EXAMPLE 7 | EXAMPLE 8 |
| EPDM rubber having a Mooney viscosity of 79.5 | | | | | | | | |
| FEF Black | 55.0 | 55.0 | 55.0 | 55.0 | 55.0 | 55.0 | 55.0 | 55.0 |
| AGERITE® MA | 1.0 | 1.0 | 1.0 | 1.0 | 1.0 | 1.0 | 1.0 | 1.0 |
| VULCUP® 40 KE | 3.0 | 3.0 | 3.0 | 3.0 | 3.0 | 3.0 | 3.0 | 3.0 |
| CURE: 5' at 190° C. (374° F.) | | | | | | | | |
| TEST RESULTS | | | | | | | | |
| Mooney viscosity (ML$_{1+4}$) at 212° F. | 45.0 | 58.0 | 64.0 | 89.0 | 54.0 | 57.5 | 50.5 | 54.5 |
| SWELL RATIO | 4.36 | 4.12 | 5.04 | 5.79 | 4.34 | 4.38 | 4.59 | 4.44 |
| EXTRACT, % | 4.15 | 4.52 | 5.56 | 5.74 | 7.92 | 4.35 | 5.36 | 3.71 |
| TENSILE, PSI | 2570 | 2480 | 2030 | 1560 | 2080 | 2500 | 2160 | 2320 |
| ELONGATION, % | 290 | 300 | 290 | 280 | 270 | 300 | 230 | 260 |
| MODULUS AT 100% ELONG. | 780 | 880 | 760 | 770 | 820 | 840 | 920 | 900 |
| MODULUS AT 200% ELONG. | 1940 | 1880 | 1640 | 1400 | 1630 | 1800 | 1830 | 1860 |
| MODULUS AT 300% ELONG. | 2740 | 2440 | 2030 | — | — | 2560 | — | — |
| HOT OIL RESISTANCE, % | | | | | | | | |
| ASTM No. 3 Oil - 70 HRS. AT 125° C. | 77.9 | 101.0 | 139.7 | 199.0 | 72.8 | 97.3 | 89.9 | 84.9 |
| ASTM No. 3 Oil - 100 HRS. AT 150° C. | 91.1 | 110.0 | 154.9 | 226.0 | 79.4 | 108.0 | 101.5 | 93.8 |
| COMPRESSION SET - CONST. DEFLECT. | | | | | | | | |
| 70 HRS. AT 100° C., % | 12.89 | 12.3 | 39.4 | 53.8 | 29.9 | 15.1 | 34.8 | 24.5 |
| 70 HRS. AT 150° C., % | 45.5 | 43.1 | — | — | — | 67.8 | — | 35.8 |
| SHORE A. HARDNESS*** | 80/76 | 85/82 | 82/79 | 81/77 | 83/79 | 80/77 | 77/73 | 77/73 |
| DENSITY | 1.205 | 1.211 | 1.171 | 1.139 | 1.241 | 1.174 | 1.184 | 1.180 |

*Measured at ML$_{1+8}$ at 100° C.
**Prior to use, EPCAR 5465 was extracted with solvent to remove all but about 3 weight percent of the oil. The extracted rubber has a Mooney viscosity of 94.
***Initial value/value after 10 seconds.

The above data show that significant increases in Mooney viscosity were attained with little or no negative change in EVA copolymer properties. The beneficial effects of adding a modifying elastomer to EVA gum stock in accordance with this invention is again demonstrated with resins which have been heat aged. Table III below summarizes the results of the comparison of the heat aged (unblended) resin of Example 1 and the heat aged (blended) resins of Examples 2, 6 and 8.

TABLE III

| | Heat Aging | | | | | | | | | | | |
|---|---|---|---|---|---|---|---|---|---|---|---|---|
| Physical Property | Example 1 | Net Change | % Change | Example 2 | Net Change | % Change | Example 6 | Net Change | % Change | Example 8 | Net Change | % Change |
| Tensile PSI | | | | | | | | | | | | |
| Unaged | 2880 | | | 2850 | | | 2830 | | | 2830 | | |
| 4 Days @ 160° C. | 2450 | −430 | −14.9 | 2380 | −470 | −16.5 | 2340 | −490 | −17.3 | 2470 | −360 | −12.7 |
| 7 Days @ 160° C. | 2430 | −450 | −15.6 | 2500 | −350 | −12.3 | 2220 | −610 | −21.6 | 2460 | −370 | −13.0 |
| Elongation, % | | | | | | | | | | | | |
| Unaged | 310 | | | 270 | | | 290 | | | 300 | | |
| 4 Days @ 160° C. | 260 | −50 | −16.1 | 230 | −40 | −14.8 | 240 | −50 | −17.2 | 280 | −20 | −6.7 |
| 7 Days @ 160° C. | 240 | −70 | −22.6 | 240 | −30 | −11.1 | 230 | −60 | −20.7 | 260 | −40 | −13.3 |
| Modulus | | | | | | | | | | | | |
| 100% Unaged | 800 | | | 850 | | | 1030 | | | 660 | | |
| 100%, 4 Days @ 160° C. | 920 | +120 | +15.0 | 990 | +140 | +16.5 | 1100 | +70 | +6.8 | 990 | +330 | +50.0 |
| 100%, 7 Days @ 160° C. | 1130 | +330 | +41.2 | 1060 | +210 | +24.7 | 1000 | −30 | −2.8 | 1020 | +360 | +54.5 |
| 200% Unaged | 2060 | | | 2020 | | | 1990 | | | 2010 | | |
| 200%, 4 Days @ 160° C. | 1970 | −90 | −4.4 | 2010 | −10 | −0.5 | 1980 | −10 | −5.0 | 1990 | −20 | −1.0 |
| 200%, 7 Days | 2080 | +20 | +1.0 | 2000 | −20 | −1.0 | 1970 | −20 | −10.0 | 2030 | +20 | +1.0 |
| 300% Unaged | 2870$^c$ | | | — | | | 2930$^a$ | | | 2840$^b$ | | |
| 300%, 4 Days @ 160° C. | 2620$^a$ | −250 | −8.7 | — | | | — | | | 2590$^b$ | −250 | −8.8 |
| 300%, 7 Days @ 160° C. | 2660$^a$ | −210 | −7.4 | — | | | — | | | 2640$^d$ | −200 | −7.0 |
| Shore A Hardness$^d$ | | | | | | | | | | | | |
| Unaged | 80/73 | | | 81/74 | | | 81/76 | | | 77/70 | | |
| 4 Days | 82/75 | | | 83/77 | | | 85/80 | | | 84/78 | | |

TABLE III-continued

| | Heat Aging | | | | | | | | | | | |
|---|---|---|---|---|---|---|---|---|---|---|---|---|
| Physical Property | Example 1 | Net Change | % Change | Example 2 | Net Change | % Change | Example 6 | Net Change | % Change | Example 8 | Net Change | % Change |
| @ 160° C. 7 Days | 88/76 | | | 84/79 | | | 86/81 | | | 85/79 | | |

[a] 1 Specimen
[b] 2 Specimens
[c] 3 Specimens
[d] Initial value/value after 10 seconds As shown in the data of Table III, in no case were the blended resins appreciably inferior to the unblended resin of Example 1 for any of the physical properties measured.

What is claimed is:

1. A polymer blend demonstrating improved Mooney viscosity and green strength comprising from about 90% to about 60% by weight of an amorphous ethylenevinyl acetate copolymer containing from about 40% to about 70% copolymerized vinyl acetate by weight, and from about 10% to about 40% by weight of a modifying elastomer having a Mooney viscosity of from about 65 to about 115 $ML_{1+4}$ at 100° C. wherein the modifying elastomer is selected from the group consisting of polychloroprene, polyacrylate rubber, polyurethane, chlorinated polyethylene, and polyester.

2. The polymer blend of claim 1 demonstrating an increase in Mooney viscosity of from about 10% up to about 100% as compared to the Mooney viscosity of the ethylene-vinyl acetate copolymer prior to the addition of the modifying elastomer.

3. The polymer blend of claim 1 wherein the ethylenevinyl acetate copolymer contains from about 50% to about 70% copolymerized vinyl acetate by weight.

4. The polymer blend of claim 1 crosslinked by the addition of from about 1.0 parts to about 10.0 parts per hundred parts of said blend of a peroxide crosslinking agent.

5. The polymer blend of claim 4 crosslinked by the addition of from about 2.0 parts to about 5 parts of a peroxide crosslinking agent selected from the group consisting of t-butyl perbenzoate, dicumyl peroxide; 2,5-dimethyl-2,5-di (t-butyl peroxy) hexyne-3; 1,3,5-tris-[alpha,alpha-dimethyl-alpha-(t-butyl peroxy)]-methyl benzene; alpha, alpha-bis (t-butyl peroxy) diisopropyl benzene; and, n-butyl-4,4-bis (t-butyl peroxy) valerate.

6. The polymer blend of claim 1 containing from about 5.0 parts to about 400.0 parts of filler per 100 parts of polymer blend by weight.

7. The polymer blend of claim 6 containing from about 100.0 parts to about 150.0 parts per 100 parts of polymer blend of a filler selected from the group consisting of talc, surface treated (silane) calcined kaolin clay, antimony oxide, alumina trihydrate, hydrated silica, carbon black and sintered colloidal silica.

8. The polymer blend of claim 1 containing from about 0.1 parts to about 4.0 parts by weight of an antioxidant.

9. The polymer blend of claim 8 containing about 1.0 parts per hundred parts of said blend of polymerized trimethyl dihydroquinoline antioxidant.

* * * * *